United States Patent [19]

Suga

[11] 3,802,925
[45] Apr. 9, 1974

[54] TEMPERATURE COMPENSATING DIFFERENTIAL RADIOMETER

[76] Inventor: Shigeru Suga, Yoyogi 5-20-2 Shibuya-ku, Tokyo, Japan

[22] Filed: Oct. 30, 1972

[21] Appl. No.: 301,730

[52] U.S. Cl.................. 136/213, 136/211, 136/225
[51] Int. Cl............................................. H01v 1/04
[58] Field of Search ........... 136/206, 211, 213, 225

[56] References Cited
UNITED STATES PATENTS

| | | | |
|---|---|---|---|
| 2,562,696 | 7/1951 | Canada | 136/225 |
| 3,607,445 | 9/1971 | Hines | 136/225 |
| 3,535,523 | 10/1970 | Wunderman et al. | 136/225 UX |
| 1,638,943 | 8/1927 | Little | 136/211 |
| 3,424,624 | 1/1969 | Villers et al. | 136/213 |
| 3,427,209 | 2/1969 | Hager | 136/225 |

OTHER PUBLICATIONS

"The Eppley Pyrheliometer," Bulletin No. 2, The Eppley Laboratory, Inc. (1923) Newport, R. I.

*Primary Examiner*—Carl D. Quarforth
*Assistant Examiner*—E. A. Miller
*Attorney, Agent, or Firm*—Wenderoth, Lind & Ponack

[57] ABSTRACT

A compact highly sensitive temperature compensating differential radiometer suitable for measuring different wavelengths of solar radiation and for controlling various light sources in weather or light resistance testing apparatus. The device comprises a plurality of parallel flat copper wires and a plurality of parallel flat constantan wires connected in series to form a plurality of thermo-electric couples. These couples are then formed to have light receptive faces and are positioned opposite a window in a chamber.

6 Claims, 5 Drawing Figures

PATENTED APR 9 1974 3,802,925

TEMPERATURE COMPENSATING DIFFERENTIAL RADIOMETER

This invention relates to temperature-compensating differential radiometers. More particularly, the invention relates to temperature-compensating differential radiometers which are capable of measuring radiation intensity by the use of temperature differences between two side by side metal plates each having a different emissivity on the surface thereof. The radiation measured can be from either sunlight or other light sources.

A disadvantage of prior art devices such as the Eppley pyrheliometer or the like has been their comparatively large size. In addition, these devices provide only normal sensitivity. They can be used generally for measuring the radiant energy of sunlight, but are unsuitable for measuring different wavelengths of solar radiation. The prior art devices are also unsuitable for accurately measuring artificial light sources used with weather or light resistance testing apparatus where compactness and high sensitivity are considered necessary.

Heretofore, attempts to provide a compact and highly sensitive radiometer have failed. As a result, previous application of such devices have been limited.

An object of the present invention is to overcome the above disadvantages and provide a device suitable for measuring different wavelengths of solar radiation.

Another object of the invention is to provide a compact and highly sensitive temperature-compensating differential radiometer which can be sufficiently applicable to the fully automatic control of radiant energy of various light sources in weather or light resistance testing apparatus.

These and other objects of the invention will become apparent from the following detailed description taken together with the accompanying drawings, in which.

Figure 2:
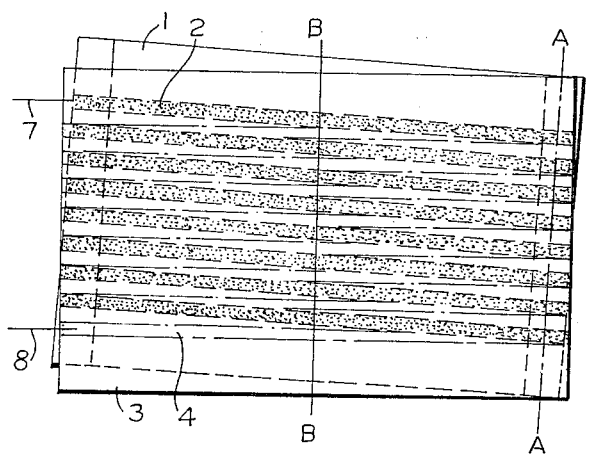
FIG. 2 is a plane view on an enlarged scale, showing the principal part of the temperature-compensating differential radiometer of the present invention.

Referring to the drawings, and specifically to FIG. 2, thin films of synthetic resin are indicated as 1 and 3. A plurality of flat wires 2 and 4 are formed in parallel on the thin films 1 and 3, respectively, using a photo-etching technique after applying metallic foil to the films. In this embodiment, copper foil is used to make the flat wires 2, and therefore becomes the positive element of the thermopile. The negative element, flat wires 4, is made from constantan foil. Hereinafter, flat wires 2 will be referred to as the positive flat wires, and flat wires 4 will be referred to as the negative flat wires.

Figure 3:
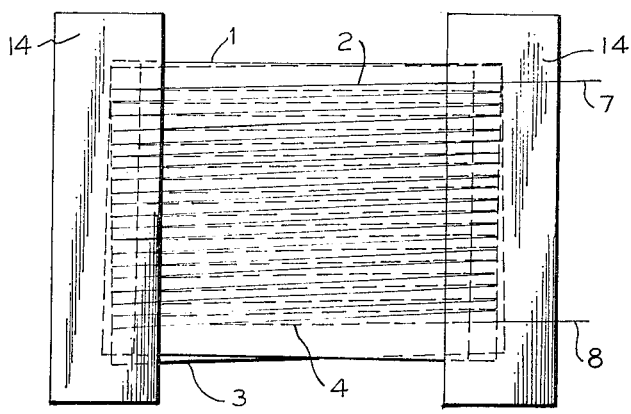
FIG. 3 is a plane view similar to FIG. 2, showing the principal part of the temperature-compensating differential radiometer with copper foil attached to both sides thereof.
Figure 4:
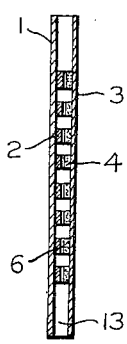
FIG. 4 is a view on an enlarged scale in vertical section taken on line A—A in FIG. 2.
Figure 5:
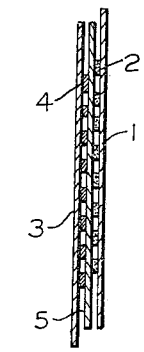
FIG. 5 is a view on an enlarged scale in vertical section taken on line B—B in FIG. 2.

Thin films 1 and 3 are positioned face to face with respect to each other in such a way that the positive and negative flat wires are obliquely arranged in series, as shown in FIG. 2. A thin film 5 of insulating synthetic resin is placed between the two films 1 and 3, as shown in FIG. 5. This insulating layer 5 is slightly shorter in length than films 1 and 3, so that the side ends of films 1 and 3 are not insulated from each other. The ends of the positive flat wires 2 are then connected to the ends of the negative flat wires 4 at both sides of the films 1 and 3 by any suitable means such as soldering, as shown in FIG. 4. It is, of course, also possible to individually coat each of the flat wires so as to insulate them from the wires on the other film in lieu of a single insulating film 5. In the event that soldering means 6 are used to connect the ends, the internal sides of the wires 2 and 4 may be solder-plated beforehand so that the areas can be securely soldered simply by applying heat thereto after putting said thin films together. The first and last ends of said series connected positive and negative flat wires are provided with lead wires 7 and 8, as shown in FIG. 2. Copper foils 14, shown in FIG. 3, are attached to each side end of the external face of said thin film to be used as light-receiving faces. Alternatively, the copper foil may be formed by the use of a photo-etching technique.

Figure 1:
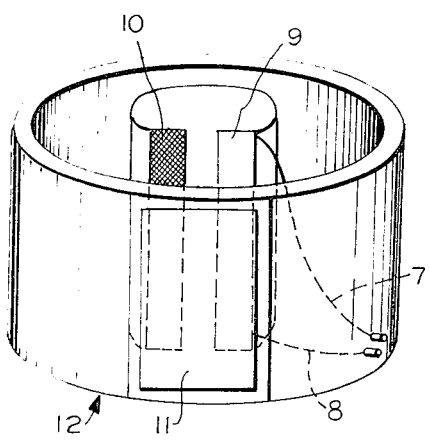
FIG. 1 is a perspective view of a temperature-compensating differential radiometer made in accordance with the present invention.

Referring now to FIG. 1, one side end is then painted black while the other side end is painted white to form light receiving faces 9 and 10. The entire element is then bent into a substantially cylindrical form so that faces 9 and 10 are positioned parallel to each other, but at a slight distance apart. Chamber 12 having a window 11 thereon encases said element and is arranged so that the light receiving faces 9 and 10 face toward said window 11. The lead wires 7 and 8 connected to the respective first and last ends of said positive and negative flat wires pass through a small hole (not shown) in chamber 12. In addition, container 12 may also be provided with top and bottom covers to protect the device.

Furthermore, according to the present invention, both light recepting faces 9 and 10 can comprise black colored faces, and either one of them can then be designed to respond to incident light.

The above description has been directed to a preferred embodiment of the present invention. It should be apparent that partly because of the fact that the flat wires are regularly disposed and partly because of the existence of the insulating thin film 5 between films 1 and 3, no shorts can develop causing deterioration of the element. In previously known devices, the strands of the thermoelectric couples, similar to the flat wires of the present invention, are relatively short, which often causes the difference in the temperature between the metal plates being used to decrease due to thermal conduction therethrough. It should be apparent, however, that since the flat wires are thin and long, such unwanted decrease can be completely eliminated.

In addition, the prior art devices utilize two concentric circular metal plates closely positioned with respect to each other, which causes a great deal of temperature interference. According to the present invention, however, the two light recepting faces 9 and 10 are disposed parallel to each other at proper intervals, and as a result, no temperature interference is caused.

It should be apparent that since the thermo-electric couple system is formed in regularly disposed flat wires from metal foil using a photo-eteching technique, the manufacturing process can be extremely simplified. In addition, the number of flat wires can be freely adjusted as the occasion demands.

From the foregoing, it will be apparent that there has been provided a compact temperature compensating differential radiometer with a high sensitivity suitable for conventional applications.

In addition, the device is suited for measuring radiant energy of different wavelengths of sunlight and for automatically controlling energy of various light sources used in weather or light resistance testing apparatus.

Furthermore, the device is capable of individually measuring the radiation intensity of ultra-violet, visible and infrared rays by mounting various filters on window 11.

What is claimed is:

1. A temperature compensating differential radiometer comprising first, second and third electrically insulating resinous films, said third film being shorter than said first and second films and being located between said first and second films, a plurality of parallel positive flat wires located between said first and second films and a corresponding plurality of parallel negative flat wires located between said second and third films, whereby said negative wires are positioned adjacent said positive wires, each of said plurality of positive and negative wires having a first end and a second end, said first end of each said positive wire being connected to the corresponding first end of each negative wire, said second end of each said positive wire being connected to the second end of each negative wire adjacent each corresponding negative wire whereby said positive and negative wires are connected in series, said second insulating resinous film electrically insulating said positive and negative wires from each other except where said ends are connected, one of said resinous films at a position adjacent said first ends having means for absorbing radiation and one of said resinous films at a position adjacent said second ends having means for reflecting radiation, and a chamber for housing said wires.

2. A temperature compensating differential radiometer as claimed in claim 1 wherein said means for absorbing radiation comprises thermal conducting means having a dark color and wherein said means for reflecting radiation comprises thermal conducting means having a light color.

3. A temperature compensating differential radiometer as claimed in claim 2 wherein said three films are substantially in the form of a cylinder, said dark colored thermal conducting means being spaced from and parallel to said light colored thermal conducting means, said chamber having a window therein and said thermal conducting means being positioned facing said window.

4. A temperature compensating differential radiometer as claimed in claim 2 wherein each of said thermal conducting means comprises copper foil.

5. A temperature compensating differential radiometer as claimed in claim 1 wherein said positive wires are composed of copper and said negative wires are composed of constantan.

6. A temperature compensating differential radiometer as claimed in claim 1 wherein said parallel positive wires are arranged obliquely with respect to said parallel negative wires.

* * * * *